United States Patent [19]

Baldwin et al.

[11] 4,138,449
[45] Feb. 6, 1979

[54] ANAEROBIC CURING COMPOSITIONS

[76] Inventors: Terence R. Baldwin, 10 High Firs Rd., Romsey, Hampshire; David J. Bennett, 61 Heathermount Dr., Edgcumbe Park, Crowthorne, Berkshire; William A. Lees, 36 Peverells Rd., Chandlersford, Hampshire, all of England

[21] Appl. No.: 745,180

[22] Filed: Nov. 26, 1976

Related U.S. Application Data

[63] Continuation of Ser. No. 576,087, May 9, 1975, abandoned.

[30] Foreign Application Priority Data

May 13, 1974 [GB] United Kingdom ............... 20979/74

[51] Int. Cl.² .......................................... C08F 279/02

[52] U.S. Cl. ................................ 260/879; 260/878 R; 260/885

[58] Field of Search ............... 260/859 R, 878 R, 879, 260/884, 885

[56] References Cited

U.S. PATENT DOCUMENTS 3,996,308  12/1976  Douek .............................. 260/859 R

*Primary Examiner*—Paul R. Michl
*Attorney, Agent, or Firm*—Oblon, Fisher, Spivak, McClelland & Maier

[57] ABSTRACT

Anaerobic curing compositions are disclosed containing from 1–50% by weight of a low molecular weight, reactive, elastomer forming polymer containing a reactive $CH_2=C(R)C(O)O-$, COOH, SH, $SO_2Cl$ or $NH_2$ group.

9 Claims, No Drawings

ANAEROBIC CURING COMPOSITIONS

This application is a continuation of our application USSN 576,087 now abandoned, filed May 9, 1975.

FIELD OF INVENTION

This invention relates to acrylate based anaerobic curing compositions, i.e. compositions comprising a polymerisable acrylate monomer or monomer mixture, the composition being so formulated or treated that the composition remains in an uncured state over long periods of time provided that the composition is exposed to an adequate supply of air or oxygen throughout that period, but which polymerises spontaneously upon the exclusion of air or oxygen therefrom, for example, when placed between air and oxygen impermeable surfaces such as metal, glass etc. Depending on the exact formulation, such compositions may be used as anaerobic adhesives, or where the adhesive properties of the cured composition are poor, simply as anaerobic sealants.

Prior Art

Anaerobic curing compositions useful as adhesives and sealants between non-porous surfaces, e.g. of metal or glass, are well known in the art. Typical anaerobic curing compositions are described in U.S. Patent Nos. 2,628,178, 2,895,950, 3,041,322, 3,043,820, 3,046,262, 3,203,941, 3,218,305, 3,300,547, 3,425,988, 3,435,012, 3,457,212, 3,547,851, 3,591,438, 3,616,040, 3,625,930, 3,634,379, 3,682,875, 3,757,828, 3,775,385, 3,795,641, 3,826,756, 3,837,963, 3,851,017 and 3,880,956.

Generally speaking, in the formulation of anaerobically curable compositions based on acrylate or substituted acrylate monomers, which are usually acrylic or substituted acrylic esters, the monomers are treated so as to render them capable of polymerising or "curing" upon the exclusion of air and oxygen, either by passing oxygen or an oxygen-containing gas such as air, through the monomer in the presence of a suitable catalyst, see for example U.K. Pat. No. 1,375,351, or by incorporating a suitable activator with the monomer.

Suitable catalysts for use when the monomers are treated by passage of air or oxygen in order to render the composition capable of curing anaerobically are tertiary amines and compounds containing the —CO—N< group, and are exemplified by dimethyl p-toluidine, tri-n-butylamine, 2-diethylaminoethanol, N-methylformamide, phthalimide, succinimide and o-benzoic sulphimide.

By "activator" is meant a substance which is capable, either directly or indirectly, of forming or causing the formation of free radicals. Suitable activators include certain peroxides, hydroperoxides and peresters, and are exemplified by cyclohexylhydroxycyclohexyl peroxide, t-butyl hydroperoxide and t-butyl perbenzoate.

In this connection it is to be noted that, as is well known, monomeric acrylate esters and substituted acrylate esters have some tendency to polymerise spontaneously and unexpectedly even in the absence of treatment intended to cause them to polymerise and, although it may not always be essential to do so, it is normal commercial practice to incorporate polymerisation inhibitors in monomeric acrylate esters supplied to the chemical industry in order to counter this tendency and thereby extend the shelf life of the monomers. In the manufacture of anaerobically curable compositions it is therefore a common practice to use such commercially available esters containing polymerisation inhibitors and, furthermore, polymerisation inhibitors in addition to any already present in the monomeric esters used as starting materials are sometimes incorporated into anaerobically curable compositions in order to confer stability, as disclosed in for example British Patent Specification No. 1,162,577.

Typical polymerisation inhibitors are quinones such as naphthaquinone, hydroquinones, sterically hindered phenols and nitroxides.

In the production of anaerobically curable compositions, the treatment of the monomeric esters with gaseous oxygen in the presence of a catalyst or the incorporation of activators has the effect of inhibiting the tendency of the monomeric esters to undergo spontaneous polymerisation whilst the supply of oxygen or air is maintained. The resulting compositions are able to remain in the unpolymerised state, often throughout periods of storage of one year or more, provided adequate access of air or oxygen to the composition is allowed. However, when access of atmospheric oxygen to the composition is prevented, as for example when some of the composition is confined between closely adjacent surfaces of non-porous materials, the compositions polymerise spontaneously to a solid state. Some such compositions show good adhesion to the confining surfaces when so cured and are therefore suitable for use as adhesives; other compositions adhere less well but find utility as sealants.

Apart from the incorporation of activators and polymerisation inhibitors in the compositions, it is also known to incorporate various other additives to modify the chemical and physical characteristics of the compositions themselves and/or the products of curing the compositions. Such additives include polymerisation accelerators, viscosity modifying agents, dyestuffs, inert fillers and plasticisers. In particular it is known to incorporate various polymers such as polyester resins, polystyrene, and unsaturated hydrocarbons and unsaturated esters. Specifically, it is known to incorporate, as thickeners in anaerobic curing compositions, polystyrene and copolymers of butadiene and styrene or butadiene and acrylonitrile, and also "synthetic rubbers," see U.S. Pat. Specifications Nos. 3,642,750 and 3,661,876.

Also, whilst most anaerobic curing compositions heretofore proposed or used are flowable liquid compositions, it has been proposed, see U.K Patent No. 1,254,584, to formulate anaerobic curing compositions which are non-flowable at 75° F. and which can therefore be preformed or preapplied to the surfaces to be bonded. Such non-flowable compositions comprise a thermoplastic polymer which is plasticised with a liquid anaerobic adhesive system. The thermoplastic materials which may be used in combination with the liquid anaerobic adhesive system include inter alia butadiene/styrene and butadiene/styrene/acrylonitrile copolymers preferably having molecular weights upwards of 5,000. Such thermoplastic copolymers are particularly characterised as polymeric materials having a substantially linear molecular structure with little or no cross-linking between the molecules of the polymer.

SUMMARY OF INVENTION

In accordance with the present invention it has been found that the impact resistance and shear strength of anaerobic curing compositions based on acrylate esters can be improved, without detriment to the storage stability and subsequent curability of the composition, by incorporating therein from 1–50% by weight, based on the total composition, of a low molecular weight, i.e. below about 6000, reactive rubber having at least one reactive site in the polymer molecule.

DETAILED DESCRIPTION

The present invention is applicable generally to acrylate ester based anaerobic curing compositions, i.e. compositions containing a polymerisable acrylate (including substituted acrylate) ester which has been formulated or treated to form a composition which is pontaneously curable in the absence of air or oxygen, but which can be maintained in an uncured state for long periods of time provided that the composition is exposed to a sufficient supply of air or oxygen.

The formulation and stabilisation of the anaerobic curing compositions is according to principles and procedures well established in the art and need not be described in detail. The following brief description is, however, given to aid an understanding of the present invention.

Broadly speaking acrylate ester based anaerobic curing compositions comprise, as the polymerisable component, an ester of the formula

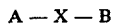

where A is a group of the formula

where
R is H, $C_1$–$C_4$ alkyl or halogen;
B is H or a group of the formula

where
R is as defined above; and
X is a divalent organic group containing at least two carbon atoms and which is free from ethylenic unsaturation except when present in groups of the formula

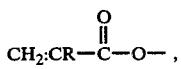

where
R is as above defined.

The preferred class of acrylate esters useful in anaerobic curing compositions according to the present invention is represented by the general formula

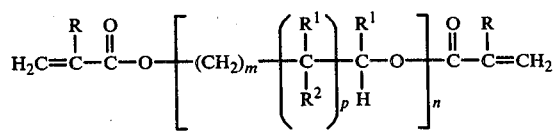

where
R is as above defined, preferably methyl;

$R^1$ is H, $C_1$–$C_4$ alkyl e.g. methyl or ethyl, $C_1$–$C_4$ hydroxyalkyl

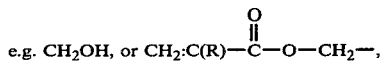

where R is as above defined;
$R^2$ is H, OH, $C_1$–$C_4$ alkyl or

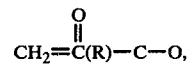

where R is as above defined;
m is an integer of at least 1, preferably from 1–8, more preferably from 1–4;
n is an integer of at least 1 and preferably from 1–20; and p is 0 or 1.

Typical acrylate esters within this class are ethylene glycol diacrylate, diethylene glycol diacrylate, di-, tri- and tetra-ethylene glycol dimethacrylate, tetraethylene glycol diacrylate, dipropylene glycol dimethacrylate, di-glycerol dimethacrylate, di-glycerol tetramethylacrylate, di-(pentamethylene) glycol diacrylate, neopentyl diacrylate and 1,1,1-trimethyol propane triacrylate.

Whilst di- and polyacrylates and methacrylates, especially the methacrylates, of the above formula are the generally preferred materials, monoacrylate esters may be used, particularly where the alcohol moiety of the ester contains a hydroxy or amino group, or other substituent providing a reactive site in the alcohol moiety available from a crosslinking reaction. Typical of such monoacrylates are the following: 2-hydroxyethyl methacrylate, cyanoethyl methacrylate, hydroxypropyl methacrylate, p-dimethylaminoethyl methacrylate, cyclohexyl methacrylate, tetrahydrofurfuryl methacrylate and chlorobenzyl acrylate.

As will be understood, the di- and polyacrylates, and monoacrylates particularly described above, merely represent typical acrylate esters used in anaerobic curing compositions. Many others will be known to those skilled in the art, inter alia from the patent specifications hereinbefore listed, and will be useful in anaerobic curing compositions according to the present invention.

As already indicated, anaerobic curing compositions based on acrylate esters generally contain one or more catalysts, activators and inhibitors in admixture with the acrylate ester to provide the anaerobic curing properties. Likewise, the compositions of the present invention will also generally contain one or more such catalysts, activators and inhibitors.

As catalysts there may be used any of the catalyst materials commonly used in the art, for example, tertiary amines and compounds containing a —CO—N< group. Typical examples are N,N-dimethyl-p-toluidine, tri-n-butylamine, 2-diethylaminoethanol, N-methyl formamide, phthalimide, succinimide, o-benzoic sulphimide and dodecyl mercaptan. As activators there will generally be used a compound capable of forming free radicals, either directly or indirectly, such compounds typically including peroxy compounds, e.g. peroxides, hydroperoxides and peresters, such as cyclohexylhydroxycyclohexyl peroxide, t-butyl hydroperoxide, t-butyl perbenzoate, hydrogen peroxide, cumene hydroperoxide, ethylene glycol dimethyl ether hydroperoxide and 2,5-dimethyl-2,5-di-(t-butylperoxy)hexane.

As inhibitors there may be used quinones such as naphthaquinone, hydroquinones, sterically hindered phenols and nitroxides.

in the range 3,000–4,000 and being of the general structure:

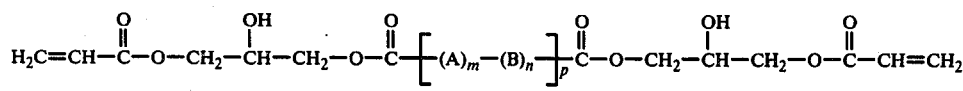

wherein
A is 1,4 polymerised butadiene unit;
B is a polymerised acrylonitrile unit;
m is an integer of at least 1;
n is 0 or an integer of at least 1;
p is an integer greater than 1.

Other additives, e.g. accelerators, viscosity modifiers, fillers, dyes and plasticizers may also be incorporated in the anaerobic curing composition as is conventional in the art.

The formulation and/or treatment of the composition to achieve the desired anaerobic curing properties will be according to principles and techniques established in the art, for example, by passage of air or oxygen through the mixture containing the monomeric ester or ester mixture, the catalyst, the activator and the inhibitor, until a stable composition capable of curing anaerobically is obtained. By "stable" we mean a composition which when heated to 100° C., will gel in a period of not less than 100 seconds. In some formulations, using certain combinations of catalyst, activator and inhibitor, the necessary stabilisation can be obtained without the necessity for oxygenation, as is known in the art. However, in the formulation of anaerobic curing compositions according to the present invention, containing a reactive rubber, oxygenation with air or oxygen is the preferred stabilisation treatment.

The low molecular weight polymers which are incorporated into anaerobic curing compositions in accordance with this invention to give improved shear strength and impact resistance to the cured composition, are low molecular weight rubbers containing at least one reactive group attached to the polymer molecule, such reactive group being of the formula —NH$_2$, —SH, —COOH, —SO$_2$Cl, or —OC(O)C(R):CH$_2$, where R is as above defined, i.e. H, C$_1$–C$_4$ alkyl or halogen, preferably hydrogen. The reactive polymers used in accordance with this invention are preferably liquids which are soluble in the acrylate ester component of the anaerobic curing composition. Preferred are liquid polymers having a number average molecular weight in the range 1000 to 6000, more preferably 2,500–5,000. Solid rubbery polymers having the specified reactive groups can be used, but give rise to phase separation problems. The preferred low molecular weight polymers have a backbone composed of polymerised butadiene units optionally with a proportion of polymerised acrylonitrile units.

Most preferred are butadiene and butadiene-acrylonitrile copolymer esters of acrylic acid or 2-alkyl substituted acrylic acids having a number average molecular weight between 3,000 and 4,000.

Typical of such acrylate terminated butadiene and butadiene/acrylonitrile copolymers are those sold by B. F. Goodrich Chemical Co. under their trade name Hycar, viz.: Hycar VTB and VTBN which are vinyl terminated butadiene and butadiene/acrylonitrile polymers, respectively, having number average molecular weights Closely related to these are vinyl terminated butadiene/acrylonitrile copolymers containing pendant as well as terminal vinyl groups and sold under the trade name Hycar VTBNX, which are particularly preferred.

Other reactive liquid, elastomer-forming, low molecular weight polymers useful in this invention include:

Hycar MTBN (mercapto terminated butadiene/acrylonitrile), molecular weight Mn 1700, acrylonitrile content 24%, structure:

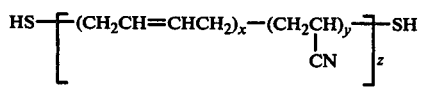

where x = 3, y = 1, z = 7;

Hycar CTBN (carboxy terminated butadiene/acrylonitrile), molecular weight Mn 3270, acrylonitrile content 19.4%, structure:

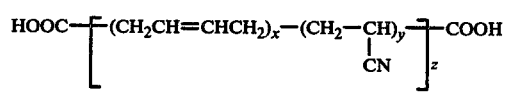

where x = 5, y = 1, z = 10; and

Hycar ATBN (amino-terminated butadiene/acrylonitrile) of the formula:

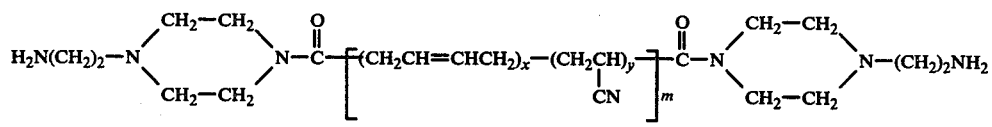

where x = 5, y = 1 and m = 10.

Besides the carboxy, amino, vinyl and mercapto terminated butadiene and butadiene/acrylonitrile polymers listed above, other low molecular weight reactive rubbers suitable for use in the present invention include urethanised polybutadienes and halogenated polybutadienes, e.g. brominated polybutadiene, butadiene/styrene copolymers, polyisoprenes and polychloroisoprenes all containing a reactive group or groups as specified. Also suitable are low molecular weight chlorosulphonated polyolefins, e.g. chlorosulphonated polyethylene.

The low molecular weight reactive polymers may be incorporated into the composition in amounts of from 1–50% by weight of the total composition. They may be incorporated into the anaerobic curing composition at any suitable time during the mixing or stabilization procedures. In the preferred technique, an anaerobic curing composition is first prepared by oxygenating a mixture of the acrylate ester containing the necessary activators, catalysts and inhibitors, adding the liquid reactive polymer to the oxygenated mixture and continuing the oxygenation until the final mixture shows a gel time at 100° C. of not less than 100 seconds.

Compositions according to this invention are illustrated in the following Examples.

EXAMPLE 1

In this example, anaerobic curing properties were imparted to the composition by passing a stream of air through the components.

A glass flask fitted with a non-metallic stirrer and provided with a supply of dry, clean air was charged with 868.5 grams of tetraethylene glycol dimethacrylate and 10 grams of 0-benzoic sulphimide which were stirred while the air was bubbled through the mixture. When the sulphimide had dissolved, 1.5 grams of N,N-dimethyl paratoluidine were added and the passage of air was continued until a sample of the mixture when heated to 100° C. failed to gel within 300 seconds. 20 grams of 2,5-dimethyl-2,5-di(t-butylperoxy) hexane (supplied by Pennwalt Corporation under the Registered Trade Mark "Lupersol 101") were then added to the mixture and the stirring and aeration continued until a sample failed to gel within 300 seconds at 100° C.

Finally, 100 grams of liquid vinyl-terminated butadiene-acrylonitrile polymer of number average molecular weight 3,400 (supplied by B. F. Goodrich Chemical Co. under the Registered Trade Mark "Hycar VTBN") were stirred into the mixture and aeration continued until a sample showed a gel time greater than 300 seconds at 100° C.

The resulting composition was a liquid which, when confined in the form of a thin film between two mild steel members, cured rapidly to a solid polymer adhering the steel members together.

For comparison, a similar composition was prepared using 968.5 grams of tetraethylene glycol dimethacrylate instead of 868.5 grams thereof, and omitting the addition of the low molecular weight polymer, the preparation of this composition being completed by the aeration following the addition of the "Lupersol 101". The composition thus produced was also an anaerobically curable liquid which could be used to adhere steel members.

However, the shear strengths of the two compositions, when determined using a bright mild steel collar and a pin, where found to be 10.0 MNm$^{-2}$ and 5.7 MNm$^{-2}$ respectively for the polymer-containing and control compositions, indicating a superior shear strength for the composition according to the invention when cured.

The break-out torques required to loosen 5/16" UNF bright mild steel nuts and bolts sealed in threaded engagement by the product of curing the polymer-containing composition and the control composition were determined as 4 Nm and 0 Nm respectively.

EXAMPLE 2

In this Example, the effect of different low molecular weight polymers each having terminal reactive centres is illustrated by compositions which differ only in the nature of the polymer added and which have the following composition expressed in parts by weight:

| | |
|---|---|
| Triethyleneglycol dimethacrylate | 867.0 g |
| O-benzoic sulphimide | 10.0 g |
| N,N-dimethyl p-toluidine | 3.0 g |
| t-butyl hydroperoxide | 20.0 g |
| Low molecular weight reactive polymer | 100.0 g |

In composition A, the polymer was a liquid vinyl-terminated butadiene-acrylonitrile; in composition B, the polymer was a liquid carboxyterminated butadiene-acrylonitrile, and in composition C, the polymer was a liquid mercapto-terminated butadiene-acrylonitrile. Each composition was prepared in the manner described in Example 1.

A control composition not according to the invention was prepared in the same manner for comparison but having an equal weight of triethyleneglycol dimethacrylate substituted for the low molecular weight polymer.

The break-out torque required to loosen 5/16" UNF bright mild steel nuts and bolts adhered in threaded engagement by the compositions of this Example after curing for 3 hours at 25° C. where determined as follows:

| Composition | Break-out Torque (Nm) |
|---|---|
| A | 4.5 |
| B | 6.3 |
| C | 5.0 |
| Control | 3.0 |

The following further properties were determined after an accelerated cure induced by heating at 120° C. for 20 minutes:

| Test | Unit of Measurement | A | B | C | Control |
|---|---|---|---|---|---|
| Shear strength (collar & pin) | MNm$^{-2}$ | 12.9 | 19.2 | 9.5 | 5.4 |
| Shear strength (lap joint) | MNm$^{-2}$ | 8.5 | 5.5 | 2.7 | 0.7 |
| Impact Strength | kpcm | 18.1 | 15.7 | 15.5 | 13.4 |
| Torque strength (break-out) | Nm | 5.9 | 13.8 | 3.6 | 2.9 |

EXAMPLE 3

This Example illustrates the effect of variation in the proportion of reactive polymer in compositions having a mono-functional acrylate ester.

A control composition not according to the invention and containing no reactive polymer was prepared for comparison in the same manner as that of Example 1, except that the low molecular weight polymer was omitted. The composition of the control composition was as follows:

| | |
|---|---|
| Tetrahydrofurfuryl methacrylate | 967.0 g |
| O-benzoic sulphimide | 10.0 g |
| N,N-dimethyl p-toluidine | 3.0 g |
| t-butyl hydroperoxide | 20.0 g |
| | 1000.0 g |

The compositions of this Example were the same as that of the Control composition except that vinyl-terminated butadiene-acrylonitrile copolymer ('HYCAR VTBN') was substituted for an equal weight of the tetrahydrofurfuryl methacrylate in the proportions (expressed as a percentage by weight of the total composition) indicated below. Physical properties of the compositions were then assessed in the same manner as before after accelerated curing by heating at 120° C. for 20 minutes.

| Test | Unit of Measurement | % HYCAR VTBN | | | | | | |
|---|---|---|---|---|---|---|---|---|
| | | 0 | 2.5 | 5 | 7.5 | 10 | 20 | 30 | 40 |
| Shear strength (collar & Pin) | MNm$^{-2}$ | 20.0 | 20.6 | 22.4 | 21.3 | 20.4 | 18.6 | 16.2 | 13.3 |
| Shear strength (lap joint) | MNm$^{-2}$ | 4.0 | 8.6 | 16.2 | 19.0 | 16.8 | 11.5 | 12.1 | 6.3 |
| Impact strength | Kpcm | 13.8 | 15.9 | 20.8 | 23.2 | 23.4 | 23.3 | 30.4 | 14.4 |

EXAMPLE 4

This Example illustrates a composition according to the invention which was rendered anaerobically curable without the passage of any oxygen containing gas through the composition.

The composition was generally similar to Composition A of Example 2 except that a quantity of naphthaquinone was substituted for an equal weight of the monomeric acrylate ester, and was prepared simply by mixing the following ingredients in the order and proportions by weight, stated as follows:

| Triethylene glycol dimethacrylate | 866.50 g |
|---|---|
| naphthaquinone | 0.50 g |
| O-benzoic sulphimide | 10.0 g |
| N,N-dimethyl p-toluidine | 3.0 g |
| t-butyl hydroperoxide | 20.0 g |
| vinyl-terminated butadiene-acrylonitrile (HYCAR VTBN) | 100.0 g |

Physical properties of the composition of Example 4 after accelerated cure at 120° C. for 20 minutes were determined and compared with those of a Control composition prepared in the same manner and with the same ingredients except that an equal weight of the monomeric acrylate ester was substituted for the butadiene/acrylonitrile polymer, as follows:

| Test | Units of Measurement | Composition of Example 4 | Control |
|---|---|---|---|
| Shear strength (collar & pin) | MNm$^{-2}$ | 14.7 | 4.9 |
| Shear strength (lap joint) | MNm$^{-2}$ | 5.0 | 0.6 |
| Impact strength | Kpcm | 21.4 | 13.7 |

EXAMPLE 5

Example 2 was repeated but using a low molecular weight amine-terminated butadiene/acrylonitrile copolymer (Hycar ATBN) as the reactive polymer. The impact shear strength and collar and pin shear strength were measured and compared with the corresponding values obtained with the same composition, but with an additional amount of triethylene glycol-dimethacrylate in place of the reactive polymer. The following results were obtained:

| | Impact Shear Strength kp.cm. | Collar and Pin Shear Strength NMm$^{-2}$ |
|---|---|---|
| Control | 10.2 | 16.25 |
| Test sample (10% ATBN) | 14.2 | 15 |

Whilst not so effective as the polymers used in earlier Examples, particularly as regards collar and pin shear strength, the data demonstrates a significantly improved impact shear strength brought about by the inclusion of the ATBN polymer.

EXAMPLE 6

Example 3 was repeated using a low molecular weight butadiene/acrylonitrile rubber containing pendant and terminal vinyl groups (Hycar VTBNX). The following results were obtained:

| | Unit of Measurement | % Hycar VTBNX | | | | | |
|---|---|---|---|---|---|---|---|
| | | 0 | 5 | 10 | 20 | 30 | 40 |
| Shear strength (collar & pin) | MNm$^{-2}$ | 20.0 | 23.1 | 23.9 | 22.4 | 18.9 | 17.2 |
| Shear strength (lap joint) | MNm$^{-2}$ | 4.0 | 4.4 | 11.5 | 15.7 | 13.1 | 12.4 |
| Impact strength | kpcm | 13.8 | 22 | 25 | 246 | 170 | 85 |

The monomeric acrylate esters used in all the compositions of the examples and the control compositions were commercially available esters which are to be presumed to contain polymerisation inhibitors such as hydroquinone in very small and sometimes chemically undetectable quantities.

We claim:

1. In an essentially solventless, liquid anaerobic curing composition, comprising an anaerobically curable monomer component consisting essentially of one or more anaerobically curable acrylate esters, the improvement which comprises incorporating therein from 1-50% by weight, based on the total composition, of a low molecular weight, reactive rubber having at least one group of the formula —NH$_2$, —OC(O)CR:CH$_2$, —COOH or —SH in the polymer molecule, where R is H, C$_1$-C$_4$ alkyl or halogen.

2. An anaerobic curing composition according to claim 1, wherein the low molecular weight rubber is a polybutadiene, a butadiene/acrylonitrile copolymer, having at least one —NH$_2$, —OC(O)CR:CH$_2$, —COOH, or —SH group in the polymer molecule, where R is H or C$_1$-C$_4$ alkyl.

3. An anaerobic curing composition according to claim 1, wherein the rubber is a vinyl terminated polybutadiene acrylonitrile copolymer having a number average molecular weight in the range 3000-4000.

4. An anaerobic curing composition according to claim 1, wherein the monomer component consists essentially of tetraethylene glycol dimethacrylate, triethylene glycol dimethacrylate or tetrahydrofurfuryl methacrylate.

5. An anaerobic curing composition consisting essentially of i) an acrylic ester selected from tetraethylene glycol dimethacrylate, triethylene glycol dimethacrylate, and tetrahydrofurfuryl methacrylate, ii) a polymerisation inhibitor, iii) an activator, iv) a polymerisation catalyst, and v) from 1-50% by weight, based on the total composition, of a vinyl terminated butadiene/acrylonitrile copolymer having a number average molecular weight 3000 to 4000.

6. In a method of producing an essentially solventless, liquid anaerobic curing composition which comprises oxygenating a monomer component consisting essentially of an acrylate ester of the formula A - X - B, where A is a $CH_2:C(R)COO-$ group, where R is H, $C_1-C_4$ alkyl or halogen;

B is H or a $CH_2:C(R)COO-$ group, where R is as defined above; and

X is a divalent group containing at least two carbon atoms and which is free from ethylenic unsaturation except when present in unsaturated groups of the formula $CH_2:C(R)COO-$, where R is as above defined, the improvement which comprises incorporating therein from 1-50% by weight based on the total composition, of a low molecular weight, reactive rubber, having at least one $-NH_2$, $-OC(O)CR:CH_2$, $-COOH_3$, or $-SH$ group in the polymer molecule, R being as above defined, and continuing the oxygenation until the gel time of the oxygenated mixture at 100° C. is not less than 100 seconds.

7. A method according to claim 6, wherein the monomer component consists essentially of tetraethylene glycol dimethacrylate, triethylene glycol dimethacrylate or tetrahydrofurfuryl methacrylate.

8. A method according to claim 6, wherein the low molecular weight polymer is a liquid vinyl terminated butadiene/acrylonitrile copolymer having a number average molecular weight in the range 3000 to 4000.

9. In a method of bonding together two surfaces, which comprises placing between said surfaces an anaerobic curing composition and excluding oxygen therefrom, thereby to effect the curing of said composition, the improvement which comprises utilizing as the anaerobic curing composition a composition as claimed in claim 1.

* * * * *